US012109637B2

(12) United States Patent
Lo et al.

(10) Patent No.: US 12,109,637 B2
(45) Date of Patent: Oct. 8, 2024

(54) FOLDABLE MITER SAW WITH SAFETY DEVICE

(71) Applicant: REXON INDUSTRIAL CORP., LTD., Taichung (TW)

(72) Inventors: Yu-Hui Lo, Taichung (TW); Yue-Yi Lin, Taichung (TW)

(73) Assignee: REXON INDUSTRIAL CORP., LTD., Taichung (TW)

( * ) Notice: Subject to any disclaimer, the term of this patent is extended or adjusted under 35 U.S.C. 154(b) by 195 days.

(21) Appl. No.: 17/557,422

(22) Filed: Dec. 21, 2021

(65) Prior Publication Data
US 2022/0193801 A1    Jun. 23, 2022

(51) Int. Cl.
*B23D 47/02* (2006.01)
*B23D 45/04* (2006.01)
*B27G 19/02* (2006.01)

(52) U.S. Cl.
CPC ........... *B23D 47/02* (2013.01); *B23D 45/044* (2013.01); *B27G 19/02* (2013.01); *Y10T 83/061* (2015.04); *Y10T 83/7697* (2015.04)

(58) Field of Classification Search
CPC ...... B23Q 11/06; B23D 45/044; B23D 47/02; B23D 47/025; B27B 5/29; H01H 3/20; H01H 13/08; H01H 43/26; H01H 51/06; H01H 9/286; H01H 9/287; H01H 21/10; H01H 9/06; F16P 3/00; Y10S 83/01; B25F 5/02; Y10T 83/7697; Y10T 83/8773; Y10T 83/061

USPC ........ 200/326, 61.52, 334, 522, 332.2, 333, 200/43.01–43.22, 522.321, 354; 83/DIG. 1
See application file for complete search history.

(56) References Cited

U.S. PATENT DOCUMENTS

| | | | | |
|---|---|---|---|---|
| 7,394,031 B2* | 7/2008 | Lee | ........................ | H01H 9/06 |
| | | | | 200/43.11 |
| 8,723,060 B2* | 5/2014 | Parrinello | ................. | B25F 5/02 |
| | | | | 200/332.2 |
| 9,993,936 B2* | 6/2018 | Ceroll | .................... | B27G 19/02 |
| 10,471,524 B2* | 11/2019 | Lin | ...................... | B23D 45/048 |
| 10,632,550 B2* | 4/2020 | Lin | ...................... | B23D 47/025 |
| 2013/0161161 A1* | 6/2013 | Parrinello | ................. | B25F 5/00 |
| | | | | 200/43.17 |

(Continued)

FOREIGN PATENT DOCUMENTS

TW          201801830 A  *  1/2018

*Primary Examiner* — Laura M Lee
(74) *Attorney, Agent, or Firm* — BACON & THOMAS, PLLC

(57) ABSTRACT

A foldable miter saw with safety device includes a base unit having a working surface and an axial holder, and a cutting unit including a rotating member, a blade, a driving unit and a safety assembly that has a safety switch and a safety member. When the safety switch is not operated, the driving unit cannot drive the blade to rotate. During the period when the rotating member rotates to drive the blade from a working position to a folded position, a free end of the safety member can be rotated downward under the action of gravity, so that the safety member can rotate to an anti-touch position where the free end is relatively close to the safety switch so that the safety switch cannot be operated, and the driving unit cannot drive the blade to rotate, which can avoid accidentally touching the blade to rotate.

8 Claims, 10 Drawing Sheets

(56) References Cited

U.S. PATENT DOCUMENTS

| | | | |
|---|---|---|---|
| 2014/0251106 A1* | 9/2014 | Gehret | B23D 45/044 |
| | | | 83/471.3 |
| 2016/0221210 A1* | 8/2016 | Lin | B27B 5/29 |
| 2017/0239737 A1* | 8/2017 | Lin | B23D 45/04 |
| 2022/0193801 A1* | 6/2022 | Lo | B27G 19/02 |
| 2023/0096148 A1* | 3/2023 | Lung | B23D 45/044 |
| | | | 83/471.3 |

* cited by examiner

FOLDABLE MITER SAW WITH SAFETY DEVICE

BACKGROUND OF THE INVENTION

1. Field of the Invention

The present invention relates to a sawing device, in particular to a foldable miter saw with safety device.

2. Description of the Related Art

An existing sawing machine comprises a base unit, a worktable rotatably arranged on the base unit, and a cutting unit arranged on the worktable. The cutting unit comprises a supporting arm pivoted on the worktable, a blade pivoted on the supporting arm, a driving member pivoted on the supporting arm, a handle set on the supporting arm, and a switch grip set on the handle. The switch grip can be operated to activate the power supply of the driving member to drive the blade to rotate.

When the existing sawing machine is in use, a user needs to place a workpiece on the worktable, then hold and apply force to the handle to drive the supporting arm to rotate, so that the blade approaches the workpiece downward, and at the same time press the switch grip to activate the power of the driving member, so that the blade rotates and the workpiece can be sawed. After the workpiece is sawed, the user needs to move the handle and the blade upward and away from the workpiece, and at the same time release the switch grip to stop the blade from rotating.

However, when the existing sawing machine is not in use, it occupies a large space and is not suitable for transportation. Moreover, when the user wants to move the existing sawing machine, he often holds his hand on the handle in order to facilitate the application of force. If the user forgets to remove the power supply plug and accidentally touches the switch grip provided on the handle, the blade will start, so it is quite dangerous. Moreover, there are currently some commercially available sawing machines that change the power source from the traditional plug-in type to the use of rechargeable batteries, so it is more prone to accidentally start the blade, and it is necessary to improve it.

Although there are other existing sawing machines which include a pivot installed between the worktable and the supporting arm, so that when these other existing sawing machines are not in use, the supporting arm and the blade can be rotated to a position close to the worktable to reduce the storage volume, these other existing sawing machines still cannot solve the above-mentioned problem of danger caused by accidentally touching the switch grip during transportation. Therefore, an improvement to enhance safety is desired.

SUMMARY OF THE INVENTION

The present invention has been accomplished under the circumstances in view. It is the main object of the present invention to provide a foldable miter saw with a safety device that can avoid accidentally trigging to cause rotation of the blade during transportation.

To achieve this and other objects of the present invention, a foldable miter saw with safety device comprises a base unit and a cutting unit. The base unit comprises a substantially horizontal working surface and an axle holder connected to the working surface. The axle holder forms a folding axis parallel to the working surface. The cutting unit comprises a rotating member arranged on the axle holder so as to rotate around the folding axis, a supporting arm pivotally connected to the rotating member, a blade pivoted to the supporting arm, a handle connected to the supporting arm, a driving unit operable to drive the blade to rotate, and a safety assembly set on the handle. The safety assembly comprises a safety switch and a safety member adjacent to the safety switch. When the safety switch is operated, the driving unit is operable to drive the blade to rotate. When the safety switch is not operated, the driving unit cannot drive the blade to rotate. The safety member comprises a pivot end pivoted to the handle, and a free end opposite to the pivot end.

The rotating member is rotatable around the folding axis relative to the axle holder to drive the blade to rotate between a working position and a folded position relative to the working surface. When the blade is in the working position, the blade is relatively far away from the working surface. When the blade is in the folded position, the blade is relatively close to the working surface.

During the rotation of the blade from the working position to the folded position, a rotation included angle generated between the blade and the working surface gradually decreases, and the free end of the safety member is rotatable downward under the action of gravity, so that the safety member rotates from a touchable position to an anti-touch position relative to the safety switch. When in the touchable position, the free end is relatively far away from the safety switch so that the safety switch is operable. When in the anti-touch position. the free end is relatively close to the safety switch and the safety switch is not operable.

The effect of the present invention is: When the safety switch is not operated, the driving unit cannot drive the blade to rotate. During the period when the blade is rotated from the working position to the folded position, the safety member can be rotated downward to the anti-touch position under the action of gravity, so that the safety switch cannot be operated, and the driving unit cannot drive the blade to rotate, which can prevent the blade from being accidentally triggered to rotate during transportation after being folded.

DETAILED DESCRIPTION OF THE INVENTION

Figure 1:
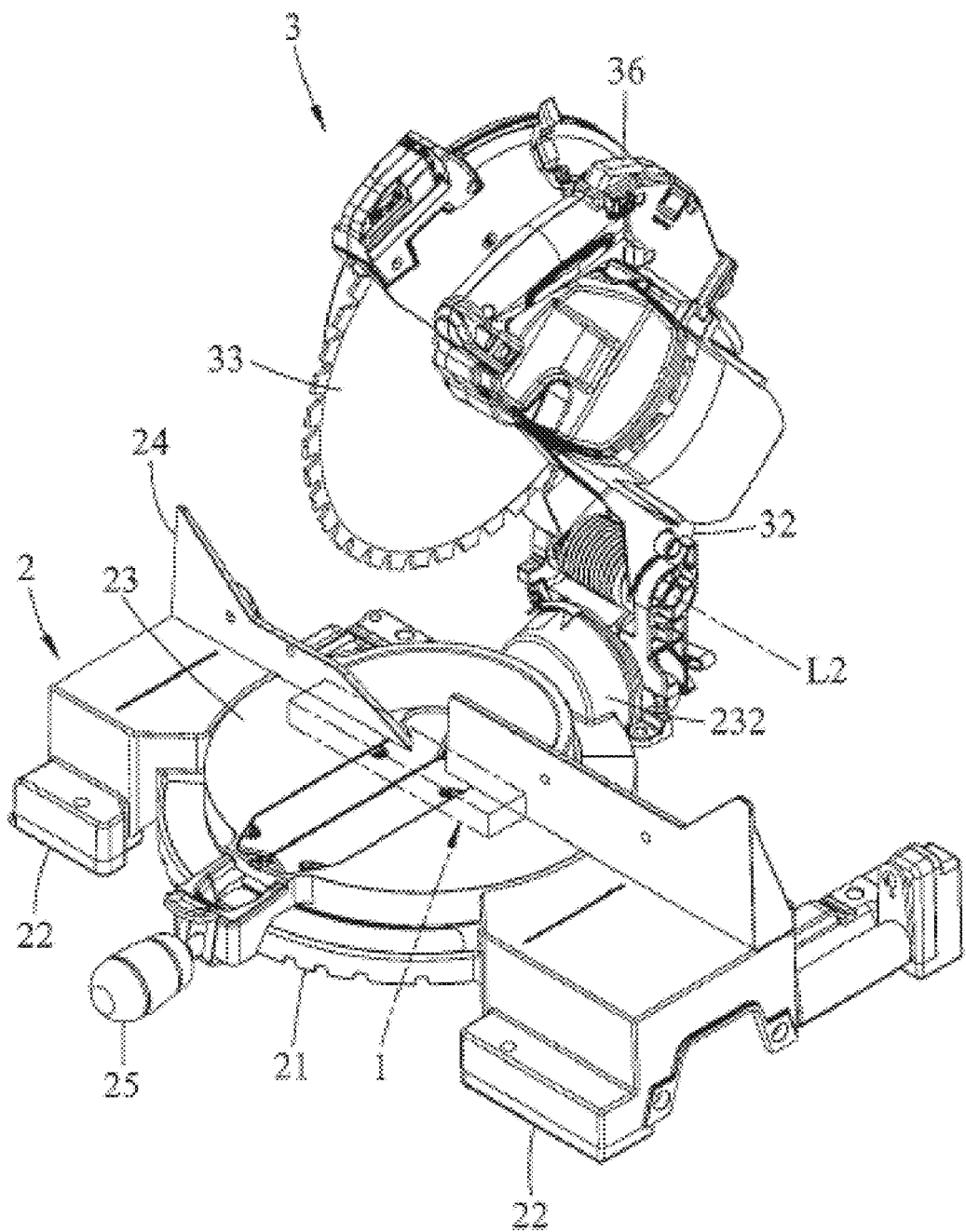
FIG. 1 is an elevational view of an embodiment of the foldable miter saw with safety device of the present invention.
Figure 2:
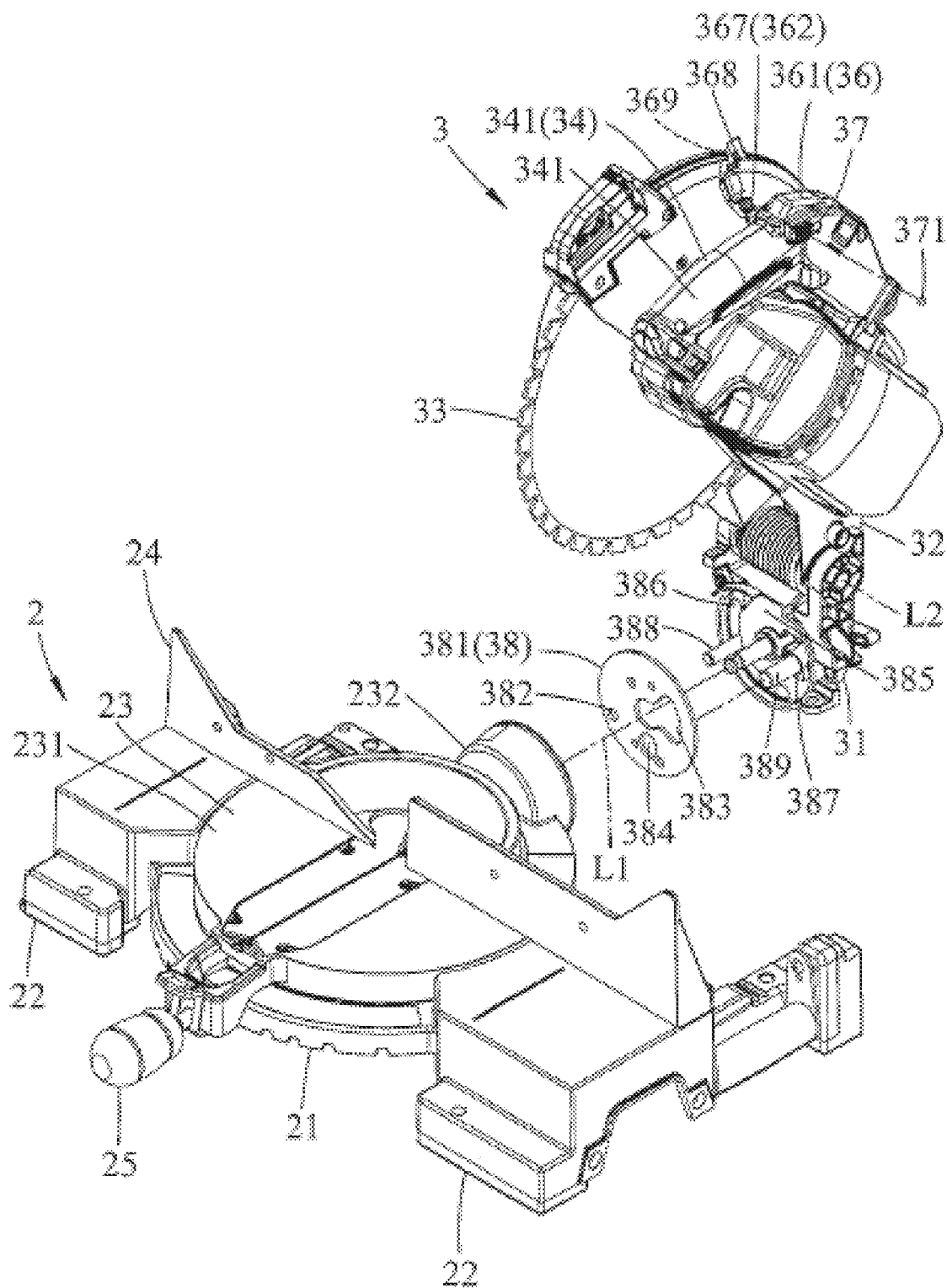
FIG. 2 is an exploded view of the embodiment.
Figure 3:
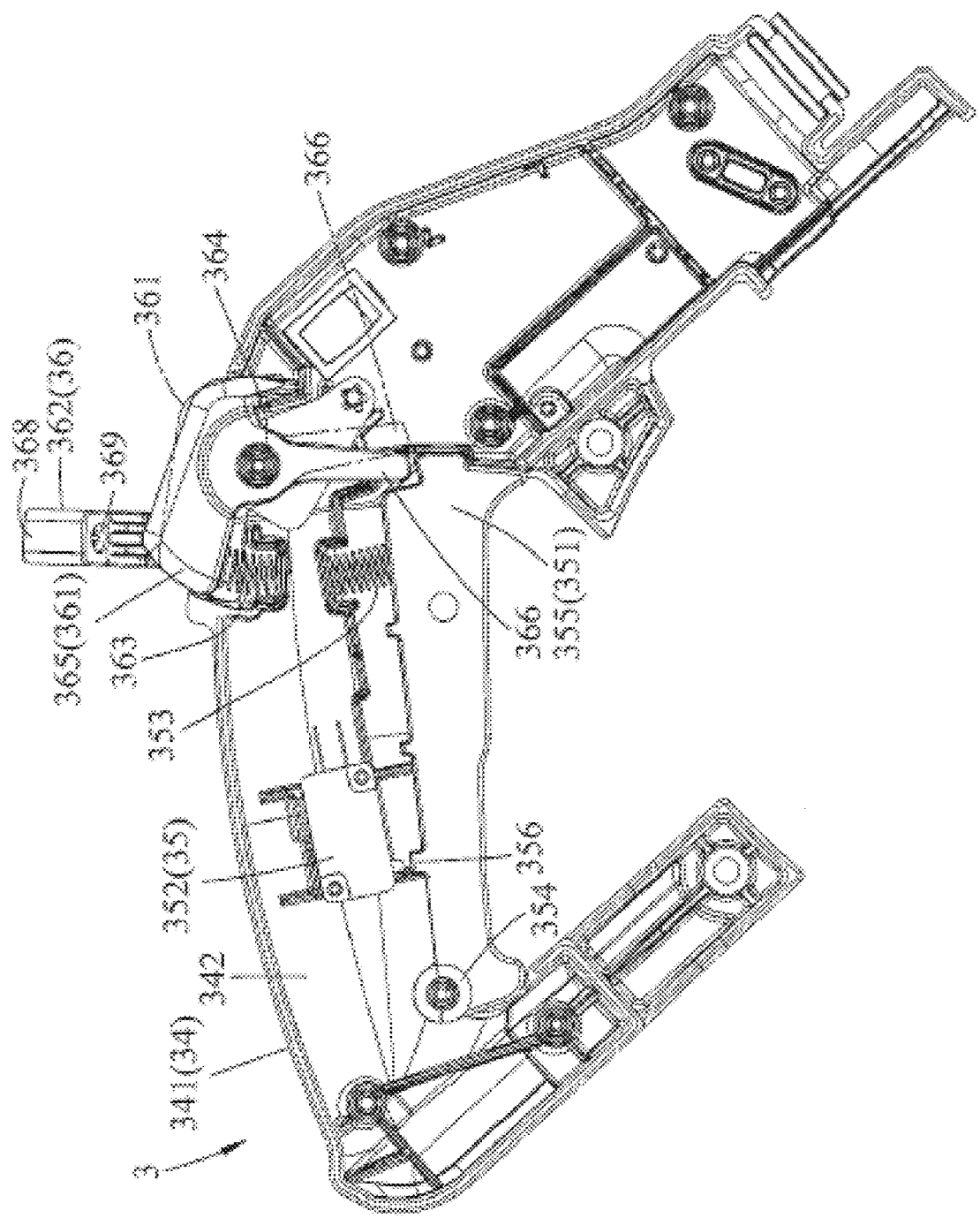
FIG. 3 is a right side view of a driving unit, a safety assembly, and a shell portion of the embodiment.
Figure 4:
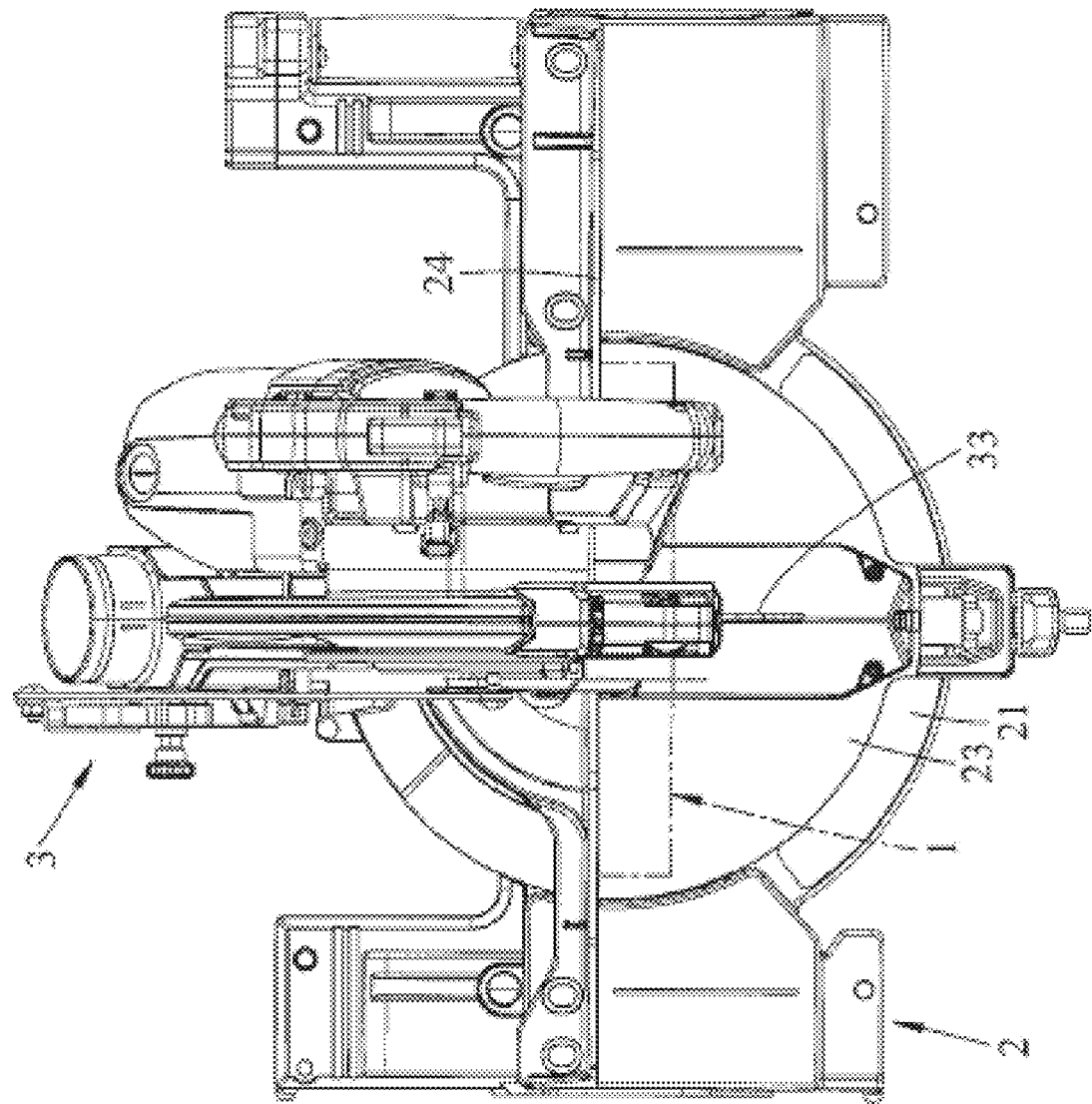
FIG. 4 is a top view illustrating that a blade of this embodiment can saw a workpiece in a 90-degree direction.

Referring to FIGS. 1, 2 and 3, an embodiment of the foldable miter saw with safety device of the present invention is suitable for sawing a workpiece 1. The foldable miter saw with safety device comprises a base unit 2 and a cutting unit 3.

The base unit 2 comprises a base 21, two foot members 22 separately arranged on two opposite sides of the base 21, a worktable 23 rotatably arranged on the base 21, and two guide rules 24 arranged between the two foot members 22 and above the worktable 23 and suitable for the workpiece 1 to abut against, and a fixing module 25 connected between the base 21 and the worktable 23 to position the worktable 23 relative to the base 21.

The worktable 23 is connected to the cutting unit 3 and comprises a substantially horizontal working surface 231 suitable for the placement of the workpiece 1, and an axle holder 232 connected to the working surface 231. The axle holder 232 forms a folding axis L1 parallel to the working surface 231.

The cutting unit 3 comprises a rotating member 31 that is rotatably arranged on the axle holder 232 around the folding axis L1, a supporting arm 32 pivotally connected to the rotating member 31, a blade 33 pivoted on the supporting arm 32 and suitable for sawing the workpiece 1, a handle 34 connected to the supporting arm 32, a driving unit 35 operable to drive the blade 33 to rotate, a safety assembly 36 arranged on the handle 34, a limit portion 37 arranged on the handle 34 and corresponding to the safety assembly 36, and a positioning module 38 connecting the rotating member 31 and the axle holder 232. In this embodiment, the cutting unit 3 also comprises a battery module (not shown) provided in the supporting arm 32.

The supporting arm 32 can rotate relative to the rotating member 31 about a sawing axis L2 perpendicular to the folding axis L1 and parallel to the working surface 231. Applying force to the handle 34 can drive the supporting arm 32 and the blade 33 to rotate around the sawing axis L2, so that the blade 33 can approach the workpiece 1 placed on the working surface 231 downwards to achieve the sawing of the workpiece 1.

The positioning module 38 comprises a fixing plate 381 disposed on the axle holder 232, a fixing hole 382 passing through the fixing plate 381, a working slot 383 and a folding hole 384 passing through the fixing plate 381 and arranged at intervals around the folding axis L1, a rotating plate 385 provided on the rotating member 31, an arc-shaped slot 386 passing through the rotating plate 385, a positioning hole 387 passing through the rotating plate 385, a guide pin 388 passing through the arc-shaped slot 386 and the fixing hole 382, and a fixing pin 389 passing through the positioning hole 387. The fixing pin 389 can be operated to pass through the working slot 383 and the folding hole 384 alternatively, and it can also be operated to be removed away from the working slot 383 and the folding hole 384.

The handle 34 comprises two opposite shell portions 341, and a chamber 342 defined by the shell portions 341.

The driving unit 35 comprises a driving handle 351 pivoted on the handle 34 and a driving member 352 arranged on the chamber 342, and can be powered on by the driving handle 351 to rotate the blade 33. A drive elastic member 353 is arranged on the handle 34 and located in the chamber 342 and adjacent to the driving handle 351. In this embodiment, the power source of the driving member 352 is from the battery module.

The driving handle 351 comprises a connecting portion 354 pivotally connected to the handle 34 and located in the chamber 342, a swing portion 355 opposite to the connecting portion 354 and partially exposed outside the shell portions 341, and a detent portion 356 disposed between the connecting portion 354 and the swing portion 355 and located in the chamber 342.

When a force is applied to the swing portion 355 to drive the detent portion 356 to contact the driving member 352, the power supply of the driving member 352 can be activated. The drive elastic member 353 can keep the detent portion 356 away from the driving member 352.

The safety assembly 36 comprises a safety switch 361 partly arranged in the chamber 342 and partly exposed outside the shell portions 341, a safety member 362 arranged in the shell portions 341 and adjacent to the safety switch 361, and a safety elastic member 363 arranged on the handle 34 and located in the chamber 342 and adjacent to the safety switch 361. When the safety switch 361 is operated, the driving unit 35 can be operated to drive the blade 33 to rotate. When the safety switch 361 is not operated, the driving unit 35 cannot drive the blade 33 to rotate.

The safety switch 361 comprises a pivot portion 364 pivoted on the handle 34, and an operating portion 365 and a stop portion 366 that are spaced around the pivot portion 364. The pivot portion 364 and the stop portion 366 are provided in the chamber 342. The operating portion 365 is partially exposed outside the shell portions 341. The safety elastic member 363 can keep the stop portion 366 facing the swing portion 355.

The safety member 362 comprises a pivot end 367 pivotally connected to one of the shell portions 341 of the handle 34, and a free end 368 opposite to the pivot end 367. The free end 368 has a magnetic area 369 made of or comprising a magnetic material. The safety member 362 corresponds to the operating portion 365 and can be operated to at least partially cover the operating portion 365.

The limit portion 37 is arranged outside one of the shell portions 341, and corresponds to the free end 368 of the safety member 362, and is provided with a magnetic member 371 made of or comprising a magnetic material. The magnetic member 371 is magnetically attracted to the magnetic area 369.

Refer to FIG. 1, FIG. 2, FIG. 4, FIG. 5, the following describes the action mode of the foldable miter saw with safety device.

The worktable 23 can rotate relative to the base 21 to drive the cutting unit 3 to rotate relative to the guide rules 24, so that the sawing direction of the blade 33 can be adjusted. For example, when the worktable 23 drives the cutting unit 3 to rotate to the position shown in FIG. 4, the work piece 1 is leaned against the guide rules 24, and the blade 33 is operated to rotate to the lower left as shown in FIG. 1 to cut the workpiece 1 in a 90-degree direction. When the worktable 23 drives the cutting unit 3 to rotate to the position shown in FIG. 5, the workpiece 1 is leaned against the guide rules 24, and the blade 33 is operated to cut the workpiece 1 in a 45-degree direction.

Referring to FIG. 2, FIG. 6 to FIG. 9, when the fixing pin 389 is operated and is far away from the working slot 383 and the folding hole 384, the rotating member 31 can rotate around the folding axis L1 relative to the axle holder 232 and drive the rotating plate 385 to rotate relative to the guide pin 388.

FIGS. 6 to 9 sequentially show the process of the rotating member 31 rotating around the folding axis L1 relative to the axle holder 232. In particular, in order to clearly illustrate the operating relationship between the rotating plate 385 and the guide pin 388 during the rotation, in FIGS. 6 to 9, the working surface 231 is marked with a two-point chain line, and some components of the base unit 2 and the fixing plate 381 not shown in these figures.

During the rotation of the rotating member 31 around the folding axis L1 relative to the axle holder 232, since the guide pin 388 passes through the arc-shaped slot 386, the rotating arc of the rotating member 31 around the folding axis L1 relative to the axle holder 232 can be restricted, and the blade 33 can be driven to rotate between a working position (see FIG. 6) and a folded position (see FIG. 9) relative to the working surface 231. The included angle between the blade 33 and the working surface 231 is defined as a rotation included angle θ. During the rotation of the blade 33 from the working position to the folded position, the rotation included angle θ gradually decreases.

In the folded position (see FIG. 9, see FIG. 2 for some components), the blade 33 is relatively close to the working surface 231 and substantially parallel to the working surface 231, and the fixing pin 389 corresponds to and can be inserted into the folding hole 384. When the fixing pin 389 is inserted into the folding hole 384 by operation, the blade 33 is positioned relative to the working surface 231.

In the working position (see FIG. 6, see FIG. 2 for some components), the blade 33 is suspended above the working surface 231 and relatively far away from the working surface 231, and the fixing pin 389 corresponds to and can be inserted into the working slot 383.

In this embodiment, in the working position (see FIG. 6), the rotation included angle θ is 90 degrees. When the fixing pin 389 is inserted in the working slot 383, the rotating member 31 can rotate about the folding axis L1 relative to the axle holder 232 to drive the blade 33 relative to the working surface 231 from the working position to rotate about 45 degrees in the direction opposite to the folded position (not shown) to adjust the cutting angle of the blade 33. But it is not limited to this.

Referring to FIGS. 3 and 6-9, the operating portion 365 of the safety switch 361 can be operated to drive the stop portion 366 to turn relative to the driving handle 351 between a locking position (see the solid line position in FIG. 3) and a release position (see the imaginary line position in FIG. 3). In this embodiment, the safety elastic member 363 can keep the stop portion 366 facing the locking position. Therefore, when no force is applied to the operating portion 365, the stop portion 366 is located at the locking position, and when the operating portion 365 is pressed, the stop portion 366 rotates to the release position.

In the locking position (see the solid line position in FIG. 3), the stop portion 366 abuts against the swing portion 355 of the driving handle 351, so that the swing portion 355 cannot rotate in the direction of the driving member 352, so that the detent portion 356 of the driving handle 351 is relatively far away from the driving member 352 and cannot turn on the power of the driving member 352.

In the release position (see FIG. 3 imaginary line position), the stop portion 366 is far away from the swing portion 355 of the driving handle 351, so that the swing portion 355 of the driving handle 351 can be operated to rotate toward the driving member 352 so that the detent portion 356 can approach and abut against the driving member 352 to turn on the power of the driving member 352.

During the period when the blade 33 is rotated from the working position (see FIG. 6) to the folded position (see FIG. 9), the rotation included angle θ gradually decreases, and the free end 368 of the safety member 362 can be rotated downward under the action of gravity, and the safety member 362 rotates from a touchable position to an anti-touch position relative to the safety switch 361.

In this embodiment, when the blade 33 is rotated until the rotation included angle θ generated between the blade 33 and the working surface 231 is less than 30 degrees, the safety member 362 is rotated from the touchable position to the anti-touch position. But it is not limited to this. The rotation included angle θ corresponding to when the safety member 362 is rotated from the touchable position to the anti-touch position can be adjusted according to different usage requirements (for example: by adjusting the position and tilting direction of the safety member 362, etc.).

In the touchable position (see FIG. 6, FIG. 7), the free end 368 of the safety member 362 is relatively far away from the safety switch 361 so that the safety switch 361 can be operated.

In the anti-touch position (see FIG. 9), the free end 368 of the safety member 362 is relatively close to the safety switch 361, and the free end 368 can be removably positioned with the limit portion 37, and the safety member 362 at least partially shield the safety switch 361 so that the operating portion 365 of the safety switch 361 cannot be operated. In this embodiment, the free end 368 is positioned with the limit portion 37 by the magnetic area 369 (see FIG. 2) and the magnetic member 371 (see FIG. 2) magnetically attracting, and the safety member 362 shields the operating portion 365 of the safety switch 361 so that the operating portion 365 cannot be pressed. But it is not limited to this.

It is defined that the blade 33 rotates in a first direction I during the period when the blade 33 rotates from the working position to the folded position. The pivot end 367 and the free end 368 of the safety member 362 are spaced along the first direction I, and the safety member 362 rotates along the first direction I during the period when the safety member 362 rotates from the touchable position to the anti-touch position.

Referring to FIGS. 2 and 4-7, when a user is using the foldable miter saw with safety device, he must first rotate the worktable 23 relative to the base 21 to drive the blade 33 of the cutting unit 3 to rotate to a predetermined cutting direction (for example: cutting direction shown in FIG. 4 or FIG. 5), then turn the blade 33 to the working position, insert the fixing pin 389 into the working slot 383, and place the workpiece 1 on the working surface 231 to abut against the guide rules 24, and then you can start sawing the workpiece 1.

Figure 6:
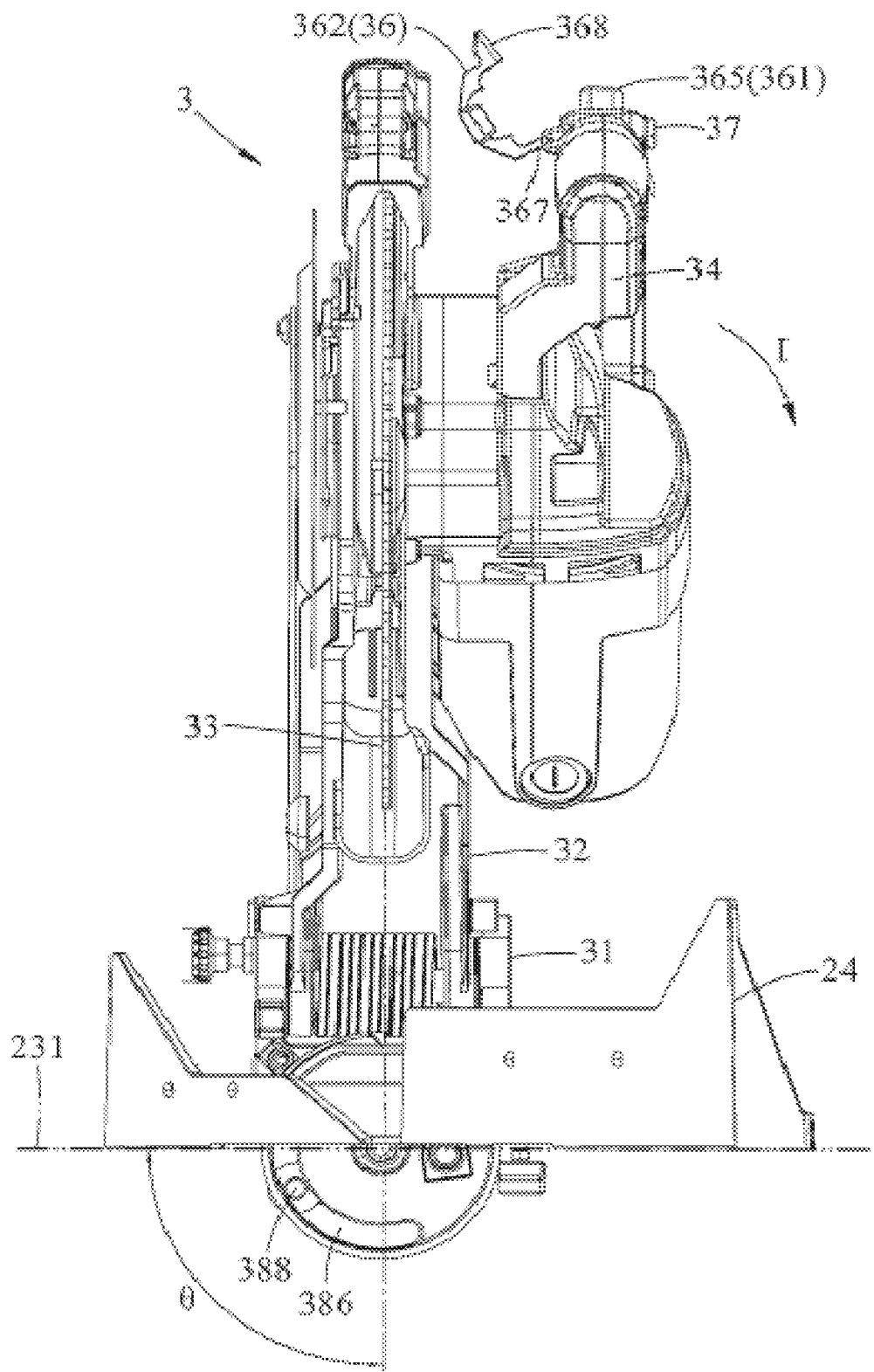
FIG. 6 is a schematic diagram illustrating that when the blade is in a working position relative to a working surface, a safety member is a touchable position and a safety switch can be operated.
Figure 7:
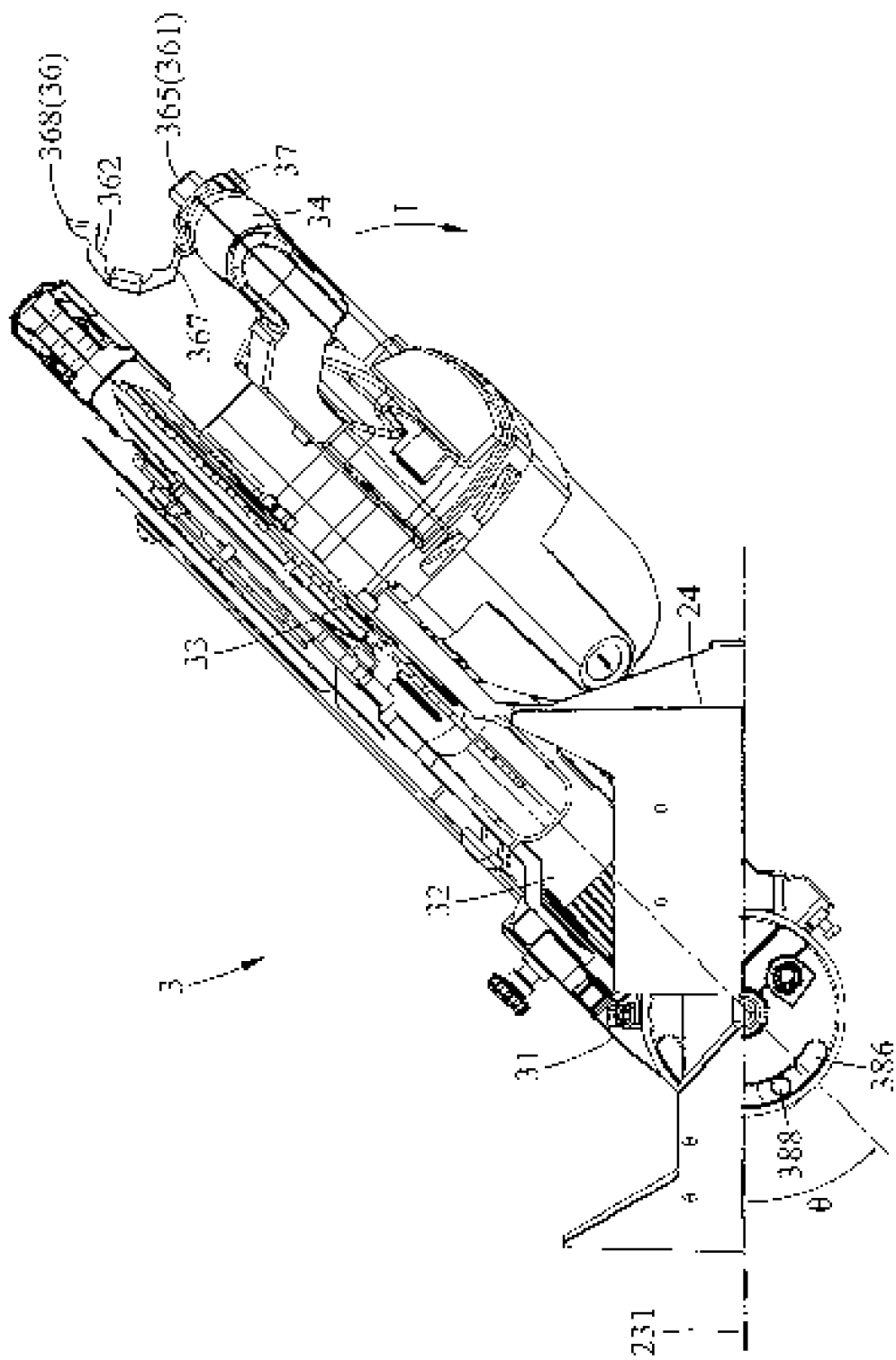
FIG. 7 is similar to FIG. 6, illustrating that when a rotation included angle generated between the blade and the working surface is 45 degrees, the safety member is in the touchable position.
Figure 8:
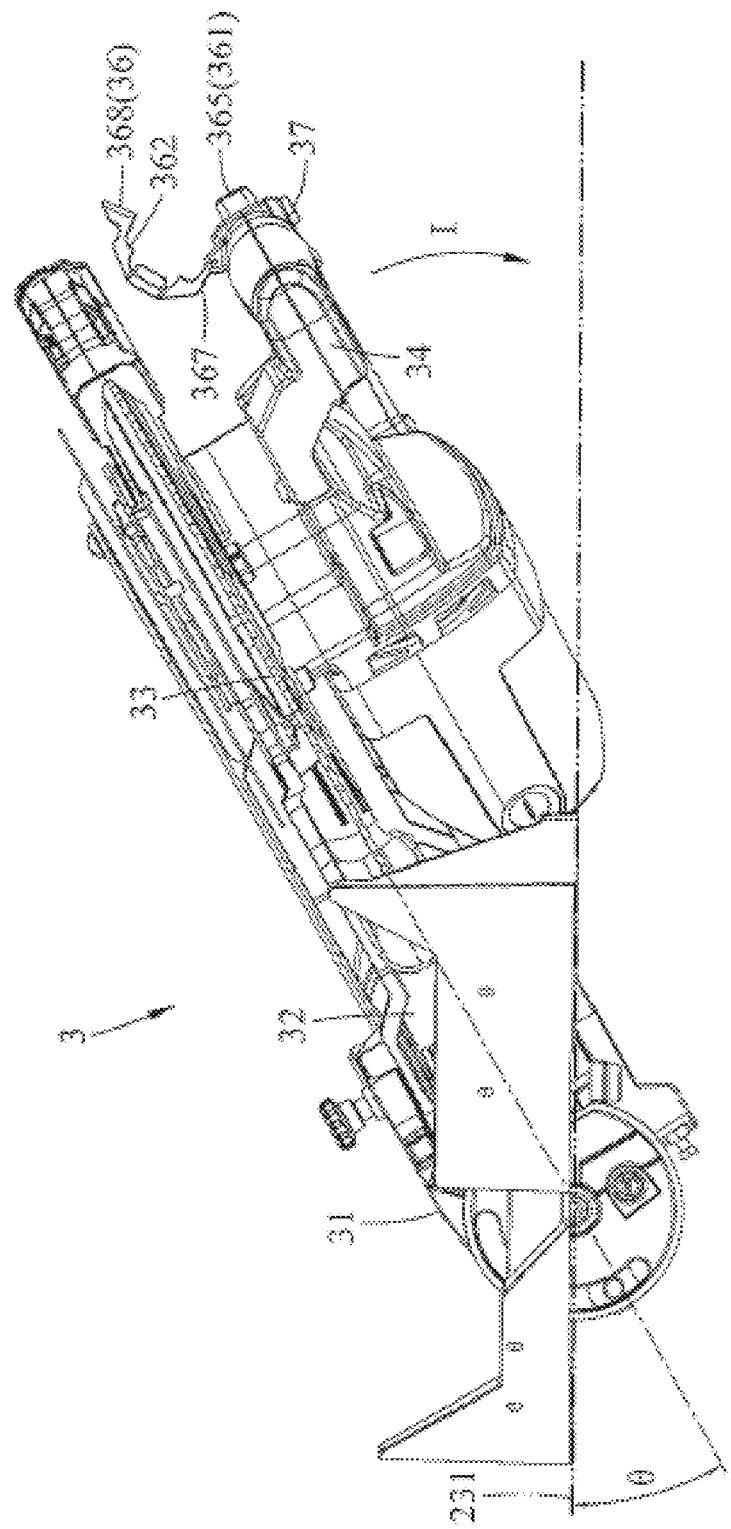
FIG. 8 is another diagram similar to FIG. 6, illustrating that when the rotation included angle is 30 degrees, the safety member is in the touchable position.

Referring to FIGS. 2, 3 and 6, when sawing the workpiece 1, first, the safety member 362 must be rotated to the touchable position, and then force is applied to the handle 34 to drive the blade 33 downward to approach the workpiece 1 placed on the working surface 231. While driving the blade 33 to approach the workpiece 1 downward, the user must first press the operating portion 365 of the safety switch 361 to rotate the stop portion 366 to the release position, then press the swing portion 355 of the driving handle 351, so that the detent portion 356 can approach and abut the driving member 352 to activate the power supply of the driving member 352, and the blade 33 can be driven to rotate to saw the workpiece 1.

Figure 5:
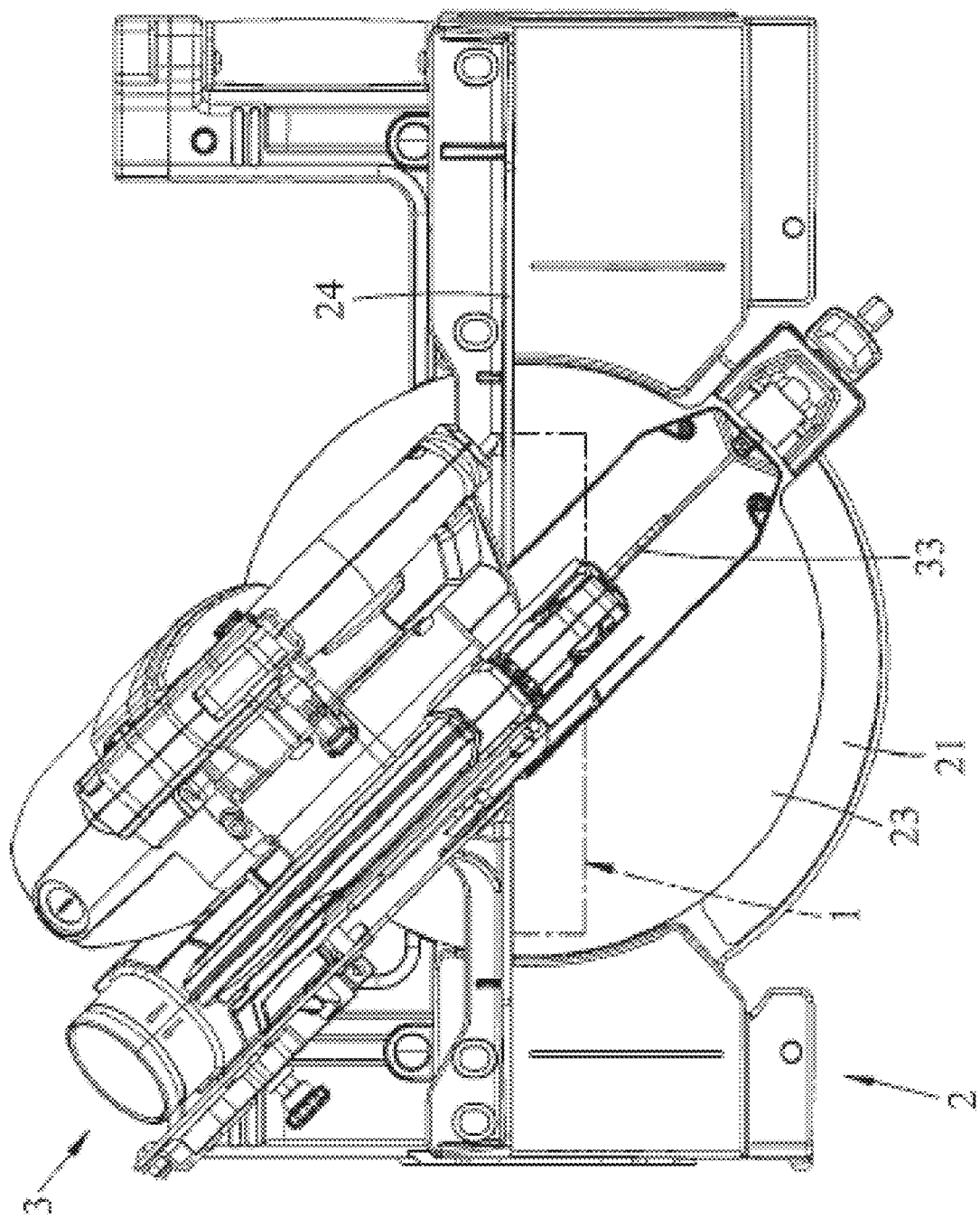
FIG. 5 is similar to FIG. 4, illustrating that the blade can saw the workpiece in a 45-degree direction.
Figure 9:
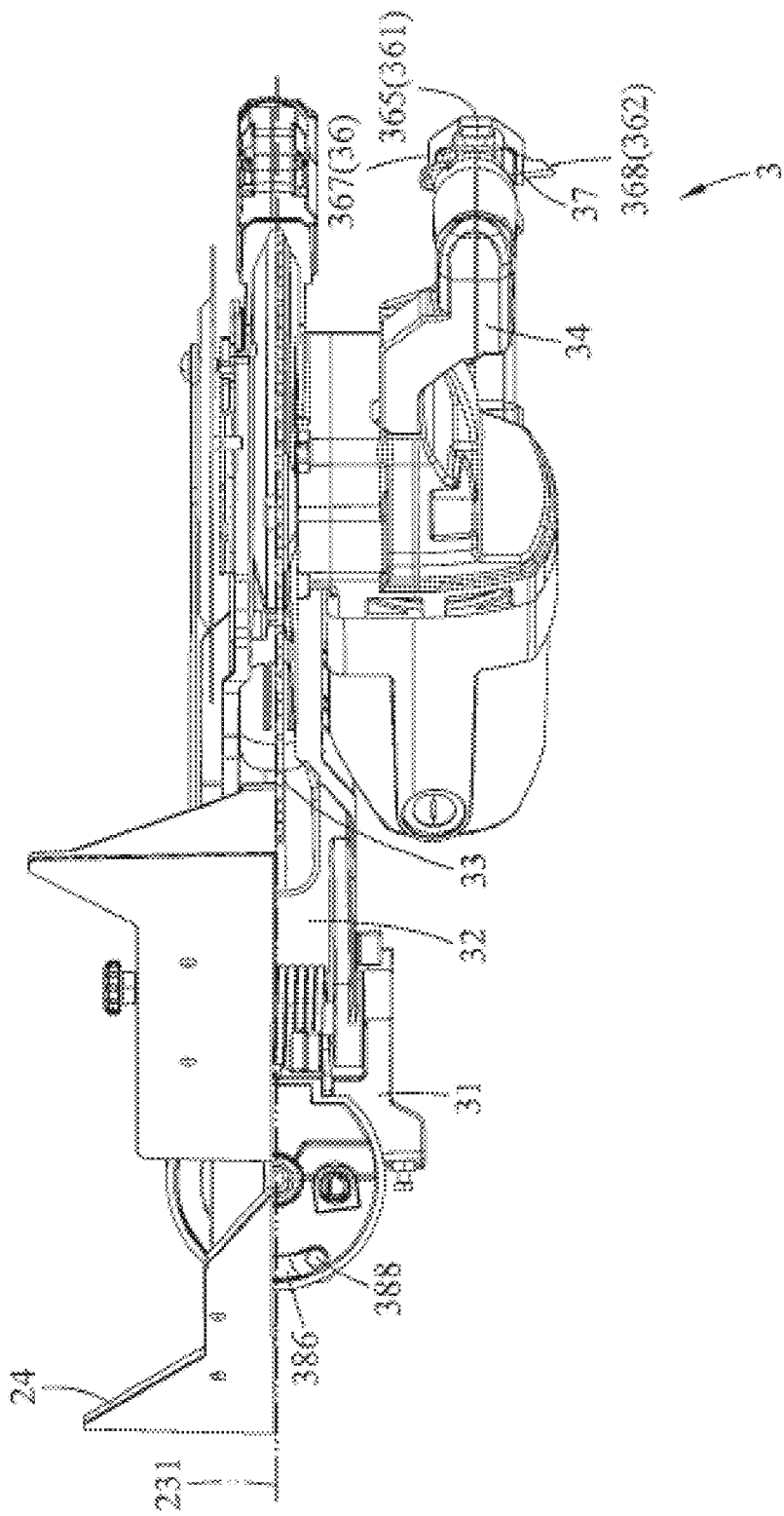
FIG. 9 is another diagram similar to FIG. 6, illustrating that when the blade is in a folded position relative to the working surface, the safety member is in an anti-touch position, and the safety member partially covers the safety switch.

Referring to FIGS. 2, 3 and 9, when the foldable miter saw with safety device is to be folded, the user must first operate to rotate the worktable 23 relative to the base 21 to drive the blade 33 of the cutting unit 3 to rotate to the position shown in FIG. 5, then turn the blade 33 to the folded position, and insert the fixing pin 389 into the folding hole 384 to complete the folding.

Figure 10:
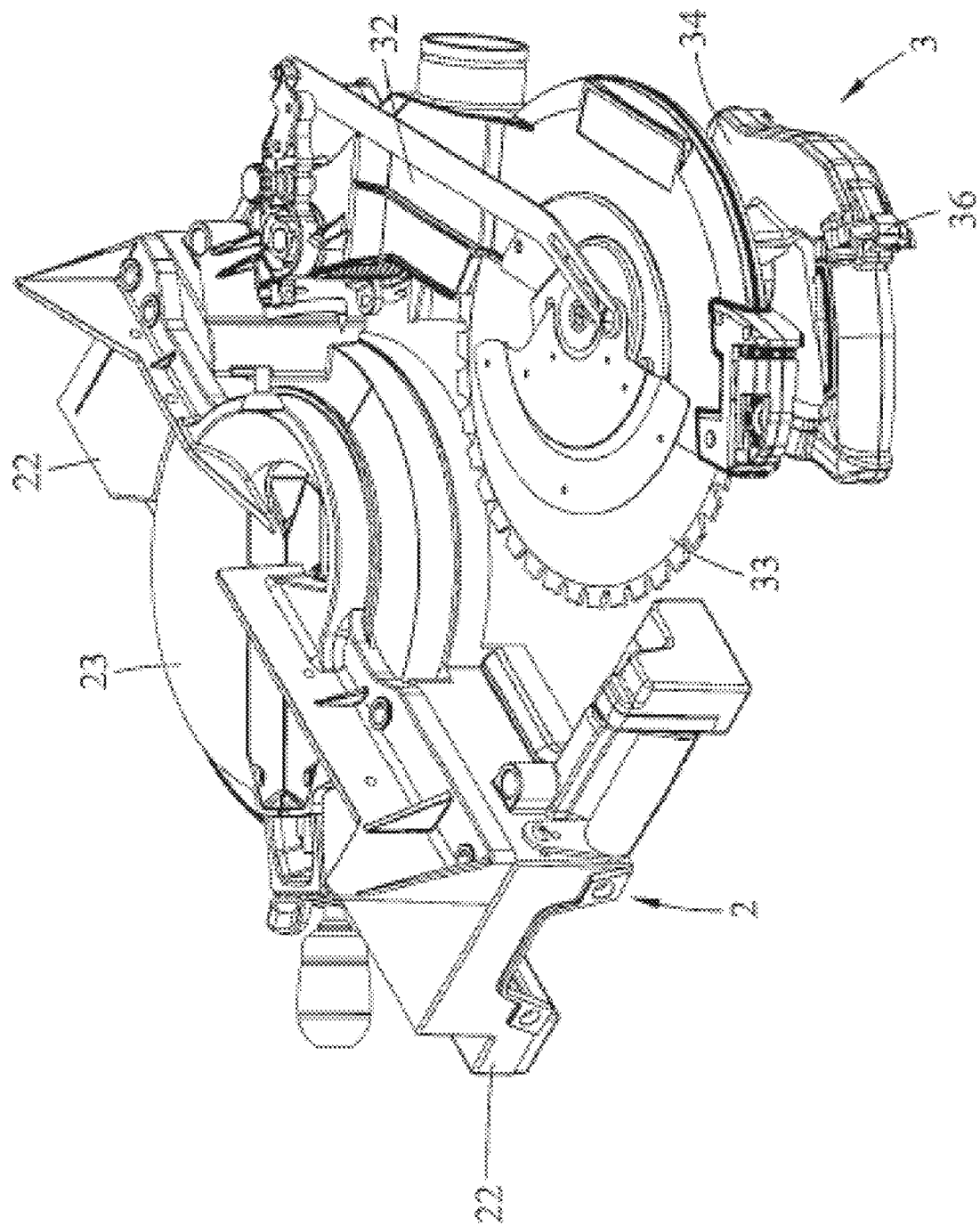
FIG. 10 is an elevational assembly view, illustrating the state of this embodiment after being folded.

Refer to FIGS. 1 and 10, FIG. 1 shows the state before the foldable miter saw with safety device is folded, and FIG. 10 shows the state after the foldable miter saw with safety device is folded. The overall volume of the foldable miter saw with safety device in FIG. 10 is smaller than that in FIG. 1, so the storage volume can be reduced. Moreover, the cutting unit 3 is substantially horizontally placed and approaches the base unit 2 not only to facilitate packaging, but also to avoid damage during transportation.

Referring to FIGS. 2, 3, 6 and 9, during the above-mentioned folding process, the safety elastic member 363 of the safety assembly 36 can keep the stop portion 366 of the safety switch 361 toward the locking position. When no force is applied to the safety switch 361, the stop portion 366 remains in the locking position, so that the detent portion 356 of the driving handle 351 is relatively far away from the driving member 352 and cannot start the power supply of the driving member 352. In other words, the user needs to press the operating portion 365 of the safety switch 361 and force the swing portion 355 of the driving handle 351 to activate the power supply of the driving member 352. Therefore, it can reduce the situation that the blade 33 is rotated by mistake in the process of folding the foldable miter saw with safety device.

In addition, during the period when the blade 33 is rotated from the working position to the folded position, the safety member 362 can be rotated downward to the anti-touch position under the action of gravity. Therefore, once the folding is completed, the safety member 362 will automatically reach the anti-touch position, so it can completely prevent the user from accidentally triggering the blade 33 to rotate after the folding or subsequent handling.

It is worth mentioning that in this embodiment, the power source of the driving member 352 is from the battery module, therefore, it is not possible to avoid accidental touch only by unplugging the power supply plug. The safety member 362 needs to be automatically rotated to the anti-touch position during the folding process to completely avoid the user's accidental triggering of the blade 33 to rotate after the completion of the folding or subsequent handling. In other implementations where the power source comes from the power supply plug, the safety member 362 can also be used to automatically rotate to the anti-touch position during the folding process, which can also avoid false triggers caused by users forgetting to remove the power plug after folding.

In summary, in the foldable miter saw with safety device of the present invention, by setting the safety switch 361, when no force is applied to the safety switch 361, the stop portion 366 is kept at the locking position, so that the detent portion 356 of the driving handle 351 is relatively far away from the driving member 352 and cannot start the power supply of the driving member 352. Therefore, it can reduce the situation that the blade 33 is rotated by accidental triggering during the process of folding the foldable miter saw with safety device. By setting the safety member 362, the safety member 362 can automatically rotate to the anti-touch position during the period when the blade 33 is rotated from the working position to the folded position, so that the safety switch 361 cannot be operated. Therefore, the driving unit 35 can not drive the blade 33 to rotate and can prevent the blade 33 from being rotated by accidental touch during transportation after being folded, so the purpose of the invention can be achieved.

However, the above are only examples of the present invention, and should not be used to limit the scope of implementation of the present invention. All simple equivalent changes and modifications made according to the scope of the patent application of the present invention and the content of the patent specification are still within the scope of the patent of the present invention.

What is claimed is:

1. A foldable miter saw with safety device, comprising:
a base unit comprising a substantially horizontal working surface and an axle holder connected to said working surface, said axle holder forming a folding axis parallel to said working surface; and
a cutting unit comprising a rotating member arranged on said axle holder so as to rotate around said folding axis, a supporting arm pivotally connected to said rotating member, a blade pivoted to said supporting arm, a handle connected to said supporting arm, a driving unit operable to drive said blade to rotate and a safety assembly set on said handle;
wherein:
said safety assembly comprises a safety switch and a safety member adjacent to said safety switch, said driving unit being operable to drive said blade to rotate when said safety switch is operated, said driving unit being unable to drive said blade to rotate when said safety switch is not operated, said safety member comprising a pivot end pivoted to said handle and a free end opposite to said pivot end;
said rotating member is rotatable around said folding axis to drive said blade to rotate between a working position and a folded position, said blade being positioned proximate to said working surface when said blade is in said folded position and said being positioned away from said working surface when said blade is in said working position;
during the rotation of said blade from said working position to said folded position, a rotation included angle generated between said blade and said working surface gradually decreases, and said free end of said safety member is rotatable downward under the action of gravity, so that said safety member rotates from a touchable position proximate to said safety switch to an anti-touch position away from said safety switch, said free end being located away from said safety switch so that said safety switch is operable when said safety member is in said touchable position, said free end being located close to said safety switch and said safety switch is not operable when said safety member is in said anti-touch position.

2. The foldable miter saw with safety device as claimed in claim 1, wherein said cutting unit further comprises a limit portion set on said handle, said limit portion corresponding to said free end of said safety member, said free end of said safety member being able to be removably contacted with said limit portion when said safety member is in said anti-touch position.

3. The foldable miter saw with safety device as claimed in claim 2, wherein said limit portion of said cutting unit is provided with a magnetic member made of or comprising a magnetic material, said free end of said safety member comprises a magnetic area made of or comprising a magnetic material, and said magnetic member and said magnetic area are magnetically attracted.

4. The foldable miter saw with safety device as claimed in claim 3, wherein when said safety member is in said anti-touch position, said safety member at least partially shields said safety switch so that the safety switch is prohibited from being operated.

5. The foldable miter saw with safety device as claimed in claim 2, wherein said blade rotates in a first direction during the period when said blade rotates from said working position to said folded position; said pivot end and said free end of said safety member are spaced along said first direction; said safety member rotates in said first direction when said safety member rotates from said touchable position to said anti-touch position.

6. The foldable miter saw with safety device as claimed in claim 2, wherein said safety switch of said cutting unit comprises a pivot portion pivoted on said handle, and an operating portion and a stop portion spaced around said pivot portion; said driving unit comprises a driving handle pivoted on said handle, and a driving member that is capable of being powered on by said driving handle to rotate said blade; said operating portion of said safety switch is operable to drive said stop portion to rotate relative to said driving handle between a locking position where said stop portion abuts said driving handle to position said driving handle farther away from said driving member than in a release position where said stop portion is far away from said driving handle, and said driving handle is able to approach said driving member to start the power supply of said driving member.

7. The foldable miter saw with safety device as claimed in claim 6, wherein said safety assembly further comprises a safety elastic member arranged on said handle and adjacent to said safety switch, said safety elastic member being able to keep said stop portion facing said locking position.

8. The foldable miter saw with safety device as claimed in claim 6, wherein said driving handle of said cutting unit comprises a connecting portion pivotally connected to said handle, a swing portion opposite to said connecting portion, and a detent portion disposed between said connecting portion and said swing portion; when said stop portion of said safety switch is in said locking position, said stop portion abuts said swing portion so that said swing portion is prohibited from being turned in the direction of said driving member, and said detent portion is away from said driving member; when said stop portion of said safety switch is in said release position, said stop portion is away from said swing portion, and said swing portion is operable to rotate toward said driving member, so that said detent portion is capable of abutting said driving member to activate the power supply of said driving member.

* * * * *